R. HANKIN & J. MOSNER.
BEAM CLAMP AND HANGER.
APPLICATION FILED MAR. 7, 1908.
947,441.
Patented Jan. 25, 1910.
2 SHEETS—SHEET 1.
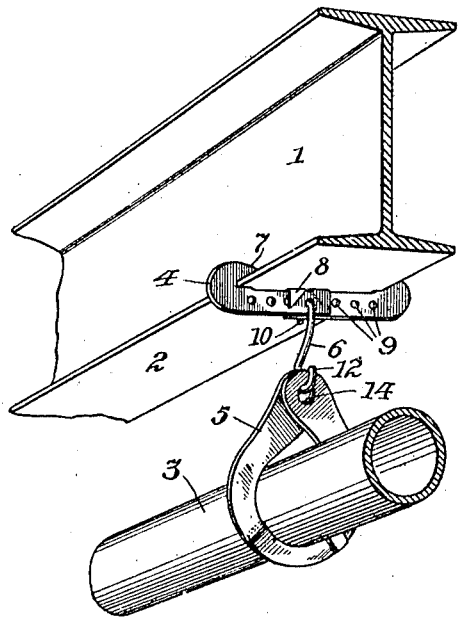
Fig. 1.
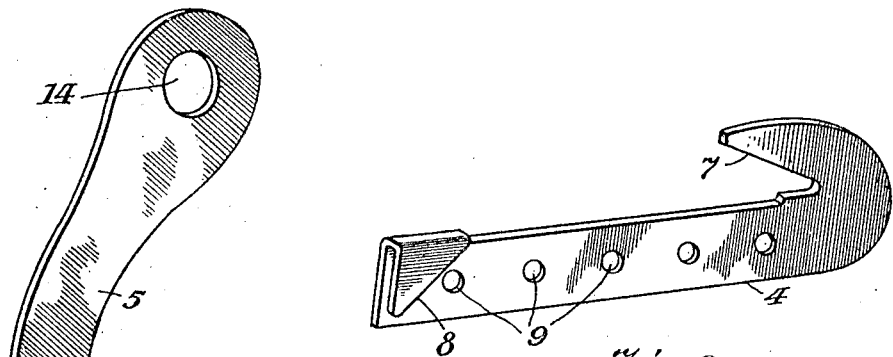
Fig. 2.
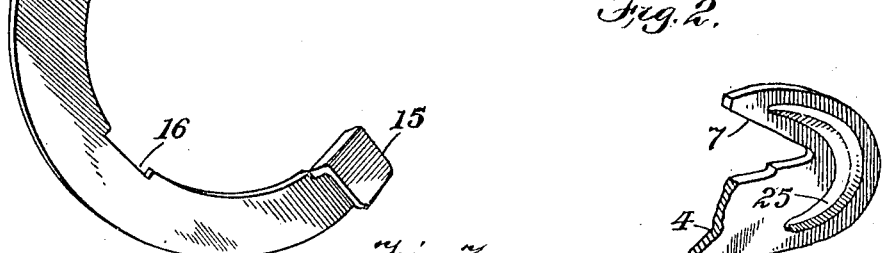
Fig. 3.
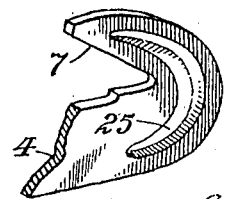
Fig. 2ᵃ.
Witnesses:
F. O. Springmeyer
Anna Costello
Richard Hankin
and John Mosner Inventors
By their Attorney
E. W. Scherr Jr.

R. HANKIN & J. MOSNER.
BEAM CLAMP AND HANGER.
APPLICATION FILED MAR. 7, 1908.

947,441.

Patented Jan. 25, 1910.
2 SHEETS—SHEET 2.

Witnesses:

Richard Hankin
and John Mosner, Inventors
By their Attorney

UNITED STATES PATENT OFFICE.

RICHARD HANKIN, OF PASSAIC, NEW JERSEY, AND JOHN MOSNER, OF NEW YORK, N. Y.

BEAM CLAMP AND HANGER.

947,441.  Specification of Letters Patent.  Patented Jan. 25, 1910.

Application filed March 7, 1908. Serial No. 419,611.

*To all whom it may concern:*

Be it known that we, RICHARD HANKIN and JOHN MOSNER, citizens of the United States, and residents of Passaic, Passaic county, State of New Jersey, and city, county, and State of New York, have invented certain new and useful Improvements in Beam Clamps and Hangers, of which the following is a specification.

Our present invention relates to improved devices for suspending pipes and the like from beams, said devices being adjustable either to various diameters of pipes or to various widths of beam or in both of these particulars.

Figure 4:
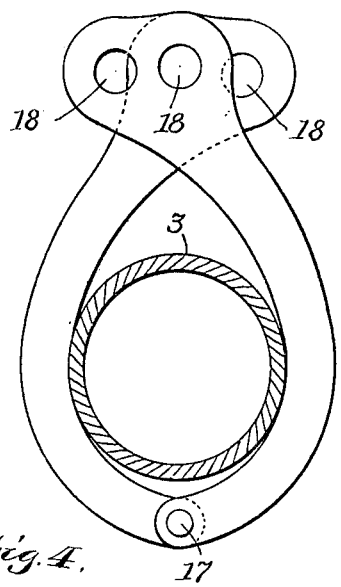
Figure 5:
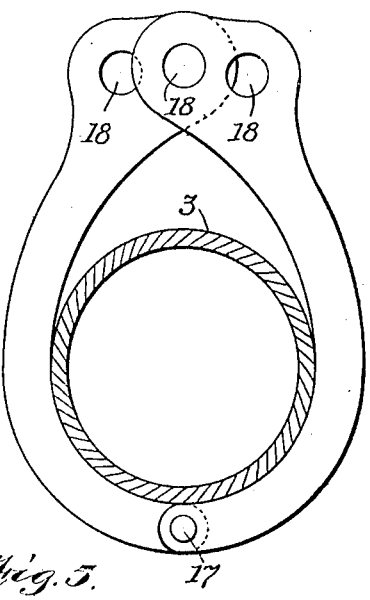
Figure 6:
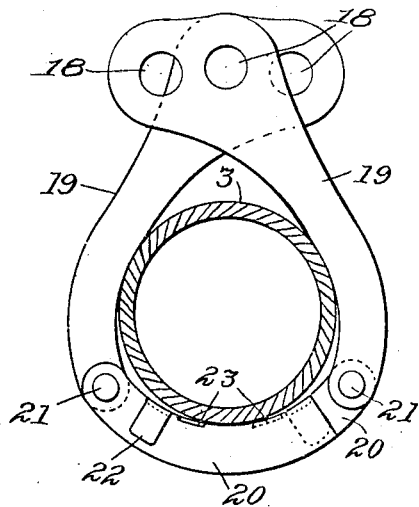
Figure 7:
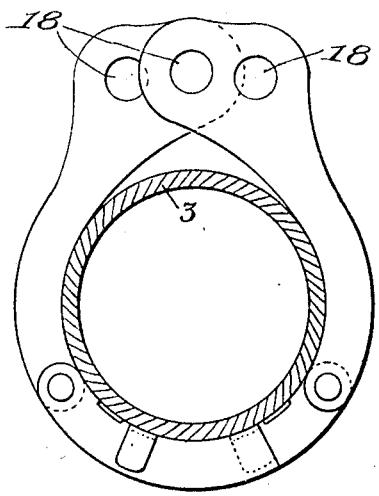

In the accompanying drawings, intended to show only certain of the forms which devices within our invention may take, Figure 1 is a perspective view of a portion of an I beam and of a pipe suspended therefrom by devices within our invention; Fig. 2 is a perspective view of one of the members making up the beam clamp in Fig. 1; Fig. 2ª is a partial view of a similar member modified; Fig. 3 is a perspective view of one of the members making up the pipe hanger of Fig. 1; Figs. 4 and 5 are front elevations of a different form of hanger showing same in two different positions of adjustment for different sizes of pipe; and Figs. 6 and 7 are front elevations of still another form of hanger likewise shown in two positions of adjustment.

Describing now our invention with particular reference to the devices shown in the drawings and beginning with Fig. 1, 1 is a portion of an I beam, the bottom flange of which is designated 2. 3 is a section of pipe shown suspended from the beam-flange 2 through devices which comprise what may be called a beam-clamp 4, a hanger 5, and a connecting link 6 between said clamp and hanger. The beam clamp is made up of two members, one of which is shown in Fig. 2. Each member has an undercut lug 7 adapted to receive or take over one edge of the beam-flange 2. Also each member of the clamp is shown provided with a bent over and down-turned lug 8 which may be cut away as shown for a purpose hereinafter described. Finally each member of the beam clamp has its length perforated with a series of holes 9.

It will be noted that a pair of members, constructed as shown in Fig. 2, may be assembled on a beam as shown in Fig. 1 with their undercut lugs 7 taking over the edges of the flange of the beam and with the down-turned lug 8 of each member overlapping the top edge and side of the other member. When so combined on the beam, the clamp will be self-supporting thereon. Moreover the clamp can be adjusted to larger or smaller widths of beam flange, because its two members can be telescoped on each other or on the other hand, can be extended. Finally once the clamp has been fitted to any given beam-flange, it can be locked in that position by moving the members slightly one way or the other to bring into alinement an opening on each member and by then inserting through the alined pair of openings a suitable locking member, in this case the hook-end 10 of a link member 6.

In Fig. 1, the two members of the clamp are shown fully extended to receive the maximum width of beam flange which that particular clamp is capable of fitting. In other words, the end holes of the members are alined. The object of cutting away the side of the down-turned lug 8 as in Fig. 2 is to permit the first hole to be located nearer to the end of the member. Greater capacity for adjustment is thereby obtained, without interference from the lug and without sacrificing the necessary strength required in said lug, the latter being secured by making the lug have a certain determined width at its top where it connects with the body of the member.

The link member 6 already referred to, may consist of a double ended hook, the upper hook 10 engaging through the alined holes in the beam clamp and the lower hook 12 engaging with the hanger, next to be described.

Three different forms of hanger are shown, one in Figs. 1 and 3, another in Figs. 4 and 5, and the third in Figs. 6 and 7. That shown in Figs. 1 and 3 comprises two separable members each similar to that shown in Fig. 3; each member may have the general form of a hook with an opening 14 through one end adapted to receive through it a hook of the link member, and further may have an outwardly extending and then downwardly turned lug 15 at its other end. Intermediate said ends and on its concave or upper edge is a notch 16. Two of these members are adapted to coact as shown in Fig. 1 wherein the lug of one member extends over the top edge of the other member and down against its side and when received in the notch 16 of the other member, locks the two members against motion on each other with the hook openings 14 in their ends alined to receive through them the hook of the link member. An inspection of Fig. 1 will now make it evident that the devices thus far described, including beam-clamp members, link member and pipe-hanger members, can be assembled as shown to suspend a pipe from a beam. The two remaining forms of hanger shown are likewise adapted to be suspended as in Fig. 1 from the beam clamp and intermediate link member by inserting the lower hook of the latter through openings provided at the top of said modified forms of hanger.

The form of hanger shown in Figs. 4 and 5 comprises two members pivoted together at their lower extremities as at 17, and each having at its upper end a plurality of openings 18 equi-distant from the pivotal connection between the members whereby the openings 18 of one member are adapted to be registered or alined with the openings 18 of the other member. Thus, Fig. 4 shows the second opening of one member alined with the second opening of the other to adapt the hanger to fit a smaller pipe; whereas Fig. 5 shows the first openings (being those nearest the upper extremities of the members) alined, in order to enlarge the space between the sides of the members and thereby adjust them to pipes of larger diameter. Instead of two openings 18 in the end of each member, a different number of said openings can of course be substituted.

The form of hanger shown in Figs. 6 and 7 comprises two separable members each of which is compound in that it consists of two members 19 and 20 pivoted together at 21. Each side member 19 may have at its upper end one or more hook-receiving openings 18, whereas each bottom member 20 has an outwardly extending, down-turned lug 22 analogous to the lug 15 already described in connection with the hanger shown in Figs. 1 and 3. Moreover each bottom member in Figs. 6 and 7 has its top edge notched preferably at a plurality of places 23, to provide a range of adjustment as follows. Thus the two members of the hanger are placed as shown in Fig. 6 with the lug 22 of one bottom member 20 overlapping the top edge and side of the other bottom member and engaging one of the notches 23 therein. When so positioned the bottom members are locked against motion on each other, in the same way already described in connection with the hanger shown in Figs. 1 and 3. Finally the pivotal connections 21 permit the side members 19 to be adjusted relative to each other to bring their openings 14 in alinement to receive through them the hook of the link member, from which to suspend the hanger. To adjust the hanger to fit other sizes of pipe it is merely necessary to disengage the lugs 22 of the bottom members from whatever notches 23 they happen to be in and to reëngage them with the proper other notches which give the correct size to the hanger to fit the given pipe. Obviously said notches need not be confined to the bottom members 20, but may be extended to the edges of the side members 19, to secure greater range of adjustment.

All of the forms of hanger, also the beam-clamp are adapted to be made out of sheet metal by first stamping out the suitable blanks and bending up the lugs as required.

Fig. 2ª shows a modified beam-clamp member having a rib 25 pressed outwardly from the side of its beam-engaging lug 7 which serves to laterally stiffen said lug and said end of the member.

Having thus described our invention, what we claim is:

1. The combination of a link-member, a beam-clamp, and a pipe-hanger; said link-member comprising a pair of hooks connected by their shanks, said member being adapted to detachably suspend the pipe-hanger from the beam-clamp; said beam-clamp comprising a pair of members each having an undercut lug adapted to take over an edge of a beam-flange, said members having portions adapted to overlap each other under the beam, said portions being perforated with a plurality of openings adapted to be alined and to receive therethrough one of the hooks of the link-member; and said pipe-hanger comprising a pair of members inclosing a space adapted to receive a pipe, said members being movably connected at their lower ends and at their upper ends having openings therethrough adapted to be alined by moving the members on each other into pipe-inclosing position, said openings when alined being adapted to receive through them the other hook of the link-member.

2. The combination of a link-member, a beam-clamp, and a pipe-hanger; said link-member comprising a pair of hooks connected by their shanks, said member being adapted to suspend the pipe-hanger from the beam-clamp; said beam-clamp consisting of two apertured parts adapted to be overlapped under a beam and to be held together by one of the hooks of the link member passed through the apertures, said parts having lugs adapted to hook over opposite edges of the beam-flange; and said pipe-hanger consisting of two members having apertured upper ends adapted to be overlapped and to be held together by the other hook of the link member inserted through the apertures, said members of the pipe hanger when so connected inclosing a space adapted to receive the pipe.

3. A hanger comprising in combination two members inclosing a space adapted to receive a pipe, said members being adapted to be suspended by their upper ends and having overlapping lower ends, each of which latter has a lug extending laterally over the top of the lower end of the other member and then downwardly next its side, said lower ends of the two members, each having a notch adapted to receive the laterally extending portion of the lug of the other member, when the members are in pipe-inclosing position.

4. A hanger comprising in combination two members inclosing a space adapted to receive a pipe, said members being movable to and from each other and having overlapping ends, the overlapping end of each of said members having a plurality of openings, the openings in one end being adapted to be successively alined with the openings in the other end by the aforesaid motion of the members to and away from each other.

5. A hanger comprising in combination two members adapted to inclose a space to receive a pipe, each of said members consisting of an upper and a lower section pivotally connected end to end, means on one of said lower sections releasably co-acting with the other lower section to connect them together, the free ends of the upper sections having openings, the opening in one section being adapted to register with the opening in the other section.

In witness whereof, we have signed our names to the foregoing specification in the presence of two subscribing witnesses.

RICHARD HANKIN.
JOHN MOSNER.

Witnesses:
Jos. F. O'Brien,
E. W. Scherr, Jr.